United States Patent

[11] 3,631,980

[72] Inventor Frank B. Hamachek III, Kewaunee, Wis.
[21] Appl. No. 847,131
[22] Filed Aug. 4, 1969
[45] Patented Jan. 4, 1972
[73] Assignee Frank Hamachek Machine Company Kewaunee, Wis.

[54] OPEN MESH BELT CLEANER
4 Claims, 3 Drawing Figs.
[52] U.S. Cl. ................................................. 209/384, 209/307
[51] Int. Cl. ...................................................... B07b 1/50
[50] Field of Search........................................... 209/307, 308, 384, 324, 389, 390; 210/158, 400

[56] References Cited
UNITED STATES PATENTS
746,089    12/1903   Jessup ........................... 209/307
946,518    1/1910    Rice .............................. 209/308
3,241,670  3/1966    Shell............................. 209/307 X
2,316,986  4/1943    Parker........................... 209/384 X
2,478,246  8/1949    Cortese et al.................. 209/384 X
1,213,239  1/1917    Noll............................... 209/384

FOREIGN PATENTS
60,649     1/1882    Germany....................... 209/384

Primary Examiner—Frank W. Lutter
Assistant Examiner—Ralph J. Hill
Attorney—Wheeler, House and Wheeler ABSTRACT: A screen conveyor having links made of thin strips with interlocked convolutions is supported and driven by sprockets having teeth engaging the openings between strips near the margins of the belts. These sprockets have notches in which are seated bars having teeth entering the bights of the convoluted strips to displace foreign matter from rows of belt openings which are spaced longitudinally of the belt, the number of bars being so related to the total number of belt openings that the belt-cleaning teeth will penetrate the openings of different rows in successive passes of the belt until all such openings have been cleaned in successive series of such passes.

PATENTED JAN 4 1972

3,631,980

INVENTOR
FRANK B. HAMACHEK III

BY Wheels, Wheels, House + Clemency
ATTORNEYS

OPEN MESH BELT CLEANER

BACKGROUND OF INVENTION

Belts of the character of that here involved are widely used for general conveying purposes. When used under circumstances such that foreign matter tends to accumulate in the belt openings, brushes have been employed in an effort to wipe the foreign matter from the belt. These are expensive and not always effective.

The particular purpose for which the belt is used in a typical apparatus embodying the present invention is to serve as a conveyor and screen in a pea-harvesting machine. These machines inherently develop considerable litter and because of the sugary sap the litter tends to adhere to the surfaces of the flat convoluted strips from which the belt links are made.

It would be undesirable to employ the metal teeth of the present invention to clean all of the successive rows of belt openings in every pass, since this would not afford adequate clearance to enable the belt to perform its desired function as a screen.

SUMMARY OF INVENTION

In combination with a belt comprising links of pivotally connected convoluted strips having rows of bight openings, cleaning bars or other supports have rows of teeth which, at predetermined intervals of the belt, pass through the bight openings in a given row to eject foreign material clinging to the belt links. The relationship of the number of links to the spacing between the cleaning teeth is such that the rows of openings missed in one pass of the belt will be penetrated by the teeth in a successive pass of the belt. This leaves a majority of openings free to perform the screening function and yet assures that periodically the openings of all rows will be cleaned.

It is broadly immaterial to the invention whether the teeth penetrate the belt from below or above. In the instant disclosure, the purposes of the invention are achieved by mounting the teeth on bars which are carried by the belt-propelling sprockets. Thus the cleaning teeth as well as the sprocket teeth enter the belt from below and, in fact, assist in belt propulsion.

Due to the link construction of the specific belt, in which nested bights of the convoluted link strips project alternately in forward and rearward directions of belt travel, and since it is desirable that the cleaning teeth fit closely to engage surfaces of the convoluted links for positive dislodgement of clinging vegetable matter, it is found desirable to have the cleaning teeth alternately offset first forwardly and then rearwardly for effective snug engagement in the bight openings.

DETAILED DESCRIPTION

Figure 1:
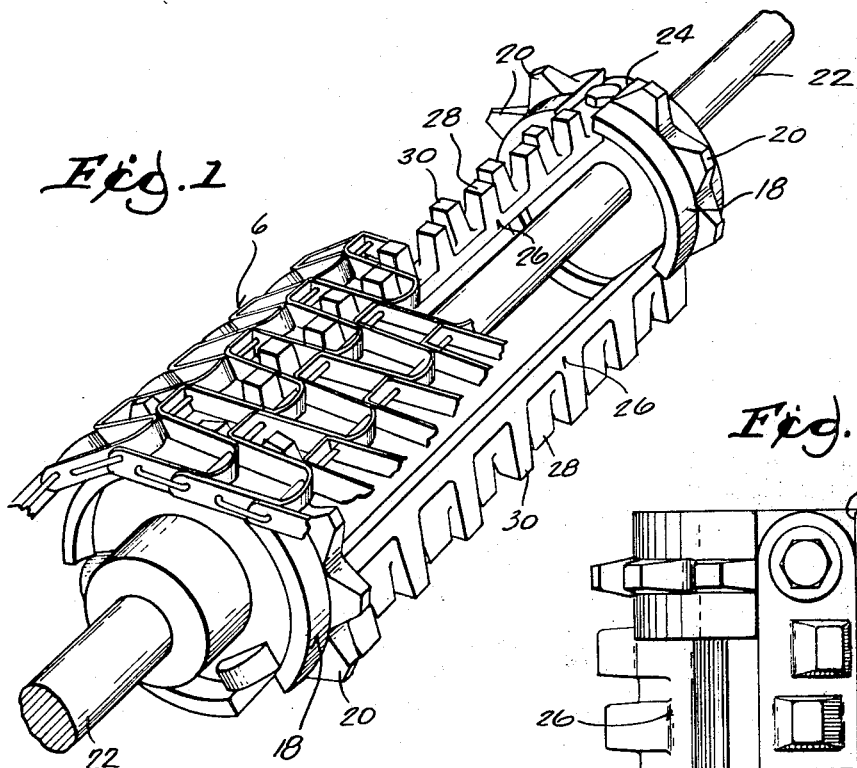
FIG. 1 is a view in perspective fragmentarily showing a belt made of linked convoluted strips and associated with a propelling sprocket and cleaner bar assembly according to the present invention.

The belt 6 exemplifying the invention is used for conveying and screening pea vinery material. The belt used in this exemplification is conventional. Each link comprises a convoluted strip 8. The bight portions 10 of each strip alternate in direction and nest with corresponding bight portions of the strip constituting the next adjacent link of the belt. The nested bight portions are linked together by cross pins 12 as clearly shown in FIG. 2. The resulting openings 14 and 16 are successively slightly offset forwardly and rearwardly of the direction of belt travel.

Figure 3:
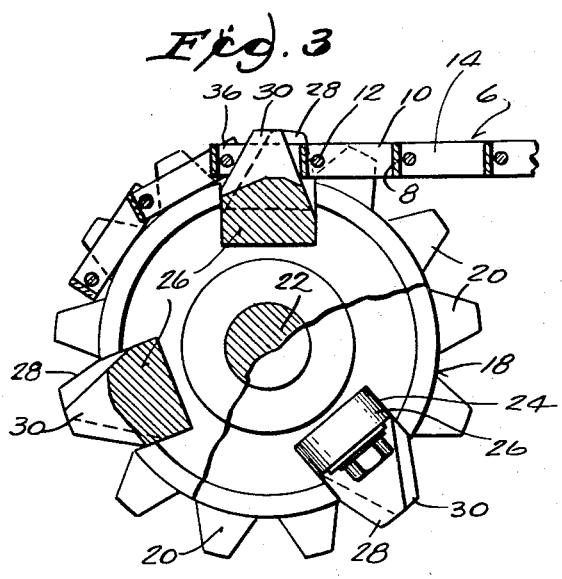
FIG. 3 is an end elevational view of the assembly, portions being broken away through the cross section indicated at 3—3 in FIG. 2.

The belt is supported and propelled by sprockets 18 disposed near the opposite side margins of the belt and comprising teeth 20 which enter the belt openings and engage the links. These sprockets are mounted on a shaft 22 as shown in FIGS. 1 and 3.

Figure 2:
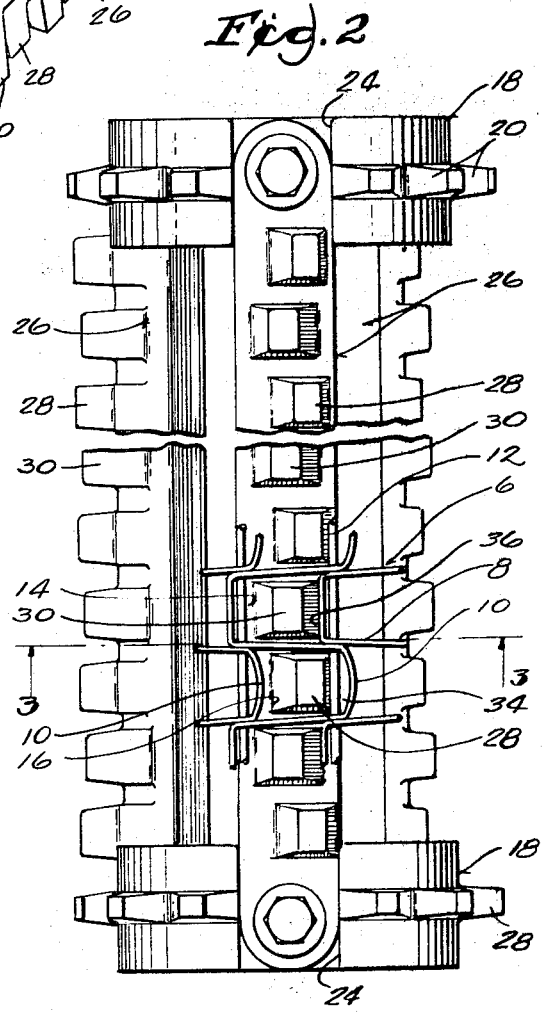
FIG. 2 is a plan view of the sprocket and cleaner bar assembly with a portion of the conveyor and screening belt fragmentarily illustrated.

In accordance with the present invention, corresponding teeth are omitted from the opposite sprockets to provide notches at 24 for bars 26. These bars span the space between the sprockets and are provided with cleaning teeth 28 and 30 which alternate as shown in FIGS. 1 and 2. These are preferably asymmetrical in addition to the fact that they are slightly offset peripherally. Thus a tooth 28 which enters a space between convolutions or bights 34 extending to the right as viewed in FIG. 2 will be offset toward the right as compared with a tooth 30 which enters a space between convolutions or bights 36 projecting to the left.

While the cleaning bar 26 takes the place of one of the propelling teeth 20 on each sprocket, the cleaning teeth engage the mesh of the belt with propelling effect which more than compensates for the teeth removed from the sprocket.

It is very important that a majority of the openings of the belt be clear so that there will be no trash buildup. This objective is achieved by having only three of the cleaning bars on a sprocket with 13 teeth. Of course in any given pass of the belt over the pair of sprockets 18, there will be only three transverse rows of belt openings which will be cleaned for every 13 rows of openings in the belt. However, the relationship between the number of cleaning bars and the total number of belt links is such that in each successive pass of the belt the cleaning teeth of the bars will operate in belt openings which were not cleaned during the previous pass. Any length of belt may be used to achieve this result except that the total number of rows of openings in the belt should not be an even multiple of the number of teeth on the drive sprocket.

The positive mechanical action of the cleaning teeth is much more effective in cleaning the belt than is possible with bristles of a brush. The teeth are equally effective on other types of belt such as belt of formed wire, or belts which are sheet aprons provided with screening apertures.

Different widths of belts may be accommodated simply by spacing the sprockets at different distances along the shaft and providing bars 26 of corresponding length and with appropriate numbers of teeth.

While the device illustrated by way of example mounts the bars on propelling sprockets, it will be evident that the bars may be on idlers.

I claim:

1. The combination with a belt conveyor which constitutes a screen for conveyed material, drive sprockets for said conveyor and provided with teeth, said conveyor comprising pivotally connected links each of which is a strip convoluted transversely of the conveyor, successive strips having their convolutions forming bights nested with corresponding convolutions of consecutive strips, said bights having portions spaced to provide apertures of said screen, at least one rotor traversed by said conveyor and having cleaning teeth respectively fitting apertures of said belt and so spaced as to provide clearance longitudinally of the belt between the apertures respectively engaged by said teeth, the spacing between cleaning teeth consecutively engaging respective apertures of the belt being other than an even multiple of the number of teeth on drive sprockets, whereby to provide clearance for facilitating the functioning of said belt as a screen, while providing for successive cleaning of differing apertures by a given tooth in the course of conveyor belt operation.

2. The combination with a conveyor screen belt having transversely arranged rows of material screening apertures, of belt-cleaning means comprising cleaning teeth spaced and dimensioned to enter said apertures, and means spaced longitudinally of the belt for supporting said cleaning teeth for entering the apertures, said supporting means being spaced to provide clearance for the discharge of material screened, belt-propulsion sprockets having teeth and spaced transversely of the belt, the respective tooth-supporting means comprising bars spanning the space between rotors and upon which the cleaning teeth are mounted, each bar being disposed in a position to replace one tooth of each sprocket, the cleaning teeth mounted on the bar assisting in belt propulsion in lieu of the sprocket teeth replaced, the number of rows of apertures in the belt being other than an even multiple of the number of teeth of the sprockets.

3. A combination according to claim 2 in which the belt comprises links having nested convolutions and the convolutions having bights which provide said openings, the nested bights of the convolutions extending alternately in opposite directions longitudinally of the belt, and the teeth mounted on said bar being offset in opposite directions longitudinally of the belt to register with the bights which provide the belt openings.

4. The combination with a belt conveyor which also constitutes a screen for conveyed material, said conveyor comprising pivotally connected links each of which is a strip convoluted transversely of the conveyor, successive strips having their convolutions forming bights nested with corresponding convolutions of consecutive strips, and said bights having portions spaced to provide apertures disposed in rows transversely of the conveyor, alternate apertures being staggered longitudinally of the conveyor in oppositely offset retention, pintle rods extending through the nesting convolutions of successive links and pivotally connecting them together, supporting and propelling means for the conveyor comprising sprockets having teeth engaged in said apertures, a shaft upon which said sprockets are mounted, certain of the teeth of said sprockets being replaced by cleaning bar seats with which the respective sprockets are provided in corresponding locations, a plurality of such bars extending transversely beneath the conveyor and engaged in the seats of respective sprockets, teeth on each such bar staggered in registry with certain of said apertures in said belt, the teeth of the bars being shaped and spaced to enter said apertures for expelling material screened by said belt, and the number of rows of apertures being other than an even multiple of the number of sprocket teeth.

* * * * *